United States Patent [19]
Dino et al.

[11] Patent Number: 6,113,809
[45] Date of Patent: Sep. 5, 2000

[54] USE OF A HIGH PURITY IMIDAZOLINE BASED AMPHOACETATES AS SURFACE ACTIVE AGENTS

[75] Inventors: David Josehph Dino, Cranbury; Anthony Homack, Jackson, both of N.J.

[73] Assignee: Rhodia Inc., Cranbury, N.J.

[21] Appl. No.: 08/734,990

[22] Filed: Oct. 22, 1996

Related U.S. Application Data

[62] Division of application No. 08/446,393, May 22, 1995, Pat. No. 5,614,473.
[51] Int. Cl.[7] .............................. B01J 13/00; B01F 17/30; C09K 7/00
[52] U.S. Cl. .................. 252/307; 252/356; 252/357; 507/102; 507/202; 507/131; 507/244
[58] Field of Search .................................... 252/356, 307, 252/357; 507/102, 202, 131, 244

[56] References Cited

U.S. PATENT DOCUMENTS 4,269,730  5/1981  Wechsler et al. ....................... 252/356
4,705,893  11/1987  Sotoya et al. ........................... 252/356

*Primary Examiner*—Philip Tucker
*Attorney, Agent, or Firm*—Andrew M. Solomon; Craig M. Bell

[57] ABSTRACT

Increased foam quality and resistance to hydrocarbon defoaming for foams used in well boring and stimulation processes as well as secondary and tertiary oil recovery is obtained using imidazoline-based amphoacetates of higher purity, containing essentially negligible amounts of unalkylated amido amines, lower amounts of glycolic acid salts and monochloroacetate salts.

The higher purity amphoacetates can be obtained via processes utilizing precise pH control during the reaction of imidazoline, or its open-chain derivatives, with alkylating agents, e.g. sodium monochloroacetate. These higher-purity amphoacetates contain essentially fully alkylated products and lower amounts of glycolic acid derivatives, even though a ratio of monohaloalkylate to substituted imidazoline, or its open-ring derivative, of less than 1.5:1.0 and close to 1.0:1.0 is used.

8 Claims, No Drawings

USE OF A HIGH PURITY IMIDAZOLINE BASED AMPHOACETATES AS SURFACE ACTIVE AGENTS

RELATED APPLICATIONS

The present application is a divisional of application U.S. Ser. No. 08/446,393 that was filed on May 22, 1995 U.S. Pat. No. 5,614,473.

This invention relates to a surfactant composition having excellent foamability and stability in a fresh water or high electrolyte atmosphere which may contain crude oil and/or hydrocarbon mixtures that is adapted for use in geothermal or air drilling or stimulation operations and secondary and tertiary oil recovery from underground oil-containing formations which use foam, such as $CO_2$ drive processes.

BACKGROUND OF INVENTION

Field of the Invention

This invention relates to a method of increasing the recovery of oil from underground subterranean formations.

In drilling a bore into the earth, universally it has been the practice to circulate a liquid, such as water, oil, a water-in-oil emulsion, or an oil-in-water emulsion, usually with mud solids suspended therein, to and from the drilling zone during the drilling operation. Circulating drilling fluids, generally known as a drilling mud, removes drilled solids from the bit and lifts cuttings from the bore to keep the drill clean and lubricated. The drilling liquid is circulated under high pressure to assure entrapment of cuttings and expulsion of mud from the bore hole.

In newly discovered oil fields, oil will usually be recovered from a producing well under the natural pressure of the fluids present in the porous reservoir rocks (primary recovery). The naturally occurring pressure in the formation decreases as the fluids are removed and about 5% to 20% of the oil present in the formation is recovered.

Secondary recovery methods are used to recover more of the oil, such as by injecting a fluid into the reservoir to drive additional oil out of the rocks, e.g., waterflooding. Waterflooding has its own limitations as it is immiscible with oil and as the water displaces the oil, oil remaining in the reservoir reaches a limiting value known as "the residual oil saturation" and oil no longer flows. There is a strong capillary action which tends to hold the oil in the interstices of the rocks. The amount of oil recovered by secondary techniques is usually from about 5% to 30% of the oil initially present.

In recent years, more attention has been directed to enhanced recovery or tertiary recovery techniques. These tertiary recovery methods are used to recover the residual oil by overcoming the capillary forces which trap oil during waterflooding, such as by adding surfactants to the flood to decrease the interfacial tension and thus allow oil droplets to move to producing wells.

Secondary recovery of oil is also possible by the miscible fluid displacement process. Propane, for example, would be an appropriate material to utilize for it is fully miscible with oil.

The use of crude oil miscible solvents such as propane alone or in combination with kerosene to displace crude oil through a formation is well known, as, for example, in the teachings of Morse in U.S. Pat. No. 3,354,953.

Some wells have been successfully drilled at a reduced pressure using a compressed gas, such as air which is pumped into the well at the drilling site. This compressed gas flows rapidly up the well bore around the drill collar carrying with it the drilled solids, thus removing them from the drill hole. While the drilling operation is essentially a dry process, in many formations water enters the bore hole from adjacent water-containing strata or trapped underground water.

There are many advantages of the gas drilling method over the more conventional mud drilling method. However, one difficulty in mist or dry gas drilling where water seeps into the bore and accumulates in the drilling zone, is that the drilled solids tend to agglomerate as the drill rotates. These agglomerated masses become too heavy to be lifted out by the gas so that antiballing agents, and foaming agents must be introduced into the bore to prevent this condition.

The technology of air and mud drilling has been combined in an attempt to provide drilling foams which have greater lifting strength than air but which do not have the pressure limitations of drilling muds.

The rheological properties of aqueous foams are of great importance for a number of applications in petroleum production. These properties include high flow rates in tubes or pipes and in porous media such as oil-bearing sandstones. Aqueous foam has advantages in oil fields that contain viscous oil in low pressure reservoirs. In these operations, the foam raises to the surface not only sand pulverized by the bit but also pebbles and rocks of considerable size.

It is also known in the art that oil not directly recoverable by direct pumping can be displaced and recovered from a subterranean reservoir by using stimulation or secondary and tertiary recovery methods such as by injecting a drive fluid containing pressurized gas, and particularly $CO_2$ in substantially liquid form, water and a surfactant or by fracturing the rock strata. Examples of this type of process can be found in U.S. Pat. Nos. 4,502,538 and 4,799,547.

It is noted that in the $CO_2$ drive system, use is made of a surfactant to form a "foam" which reduces the mobility of the $CO_2$ in the reservoir. It is well recognized in the art that many reservoir flood or drive processes, including those utilizing $CO_2$ suffer from a tendency of injected fluids to sweep oil from only a limited area of the reservoir. The fluids break through to the recovery well before they have the opportunity to efficiently invade and displace oil from the reservoir rock.

The requirements for utilization of an aqueous foam in subterranean formations include high stability with waters containing quantities of soluble salts, such as sodium chloride, calcium salts and/or magnesium salts and capability for handling a variety of foam breaking elements, e.g., hydrocarbon tolerance from such as crude oil and solids. Further, the foam must not degrade under extremes of the physical environment of use such as drilling pressure temperature, earth particles and the like.

In addition, the most important performance characteristics of a surfactant used in a $CO_2$ drive process is its ability to maintain excellent foam generation and stability properties and thus maintain control over mobility of the $CO_2$ in the presence of a wide variety of crude oils. The surfactant used in the $CO_2$ drive process should be substantially less sensitive to compositional variations and changes in the crude oil deposit as this can seriously affect the foam holding characteristics of the surfactant.

Historically, alcohol ether sulfates have been used for $CO_2$ mobility control agents. Alcohol ether sulfates provide an overall cost advantage because of a production increase.

It is an object of this invention to proved a surfactant composition having excellent foaming power and high tolerance for aqueous solutions containing electrolytes and/or hydrocarbons for use in oil well bores, such as for drilling, stimulation and secondary and tertiary oil recovery.

It is now been found that improved foam control can be obtained utilizing a specified group of amphoteric surfactants.

SUMMARY OF THE INVENTION

It has been now found that the foam holding characteristics of foam from surfactants utilized in oil wells, such as in well drilling, air drilling, foam fracturing, stimulation or gas ($CO_2$) drive processes for secondary and tertiary oil recovery can be improved by using a new and improved high purity imidazoline based amphoacetate surfactant alone or in combination with other surfactants as will be more fully outlined hereinafter. The surfactant combinations of the invention show reduced foam detriment due to contact with hydrocarbons and more tolerance to conventional anionic foaming agents presently in use in the oil industry. These features will become more fully evident in the disclosure which follows.

DETAILED DESCRIPTION OF THE INVENTION

The improved amphoacetate surfactants used in the present invention can be depicted by the formula:

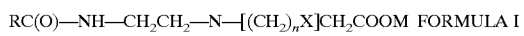
RC(O)—NH—CH$_2$CH$_2$—N—[(CH$_2$)$_n$X]CH$_2$COOM  FORMULA I wherein R is an aliphatic radical containing from about 5 to about 19 carbon atoms per molecule, X is OH or $NH_2$ and $n$ is an integer of from 2 to 4 inclusive, and wherein M is a metal. Preferably, R is an aliphatic radical containing a majority of from about 8 to about 18 carbon atoms per molecule, X is OH and $n$ equals 2.

These improved amphoacetate surfactants can be prepared by new processes which involve the use of controlled pHs during the entire reaction and particularly during the alkylation portion of the process, such as by controlled addition of an appropriate base slowly or automatically in response to a pH metering device to maintain a constant pH; or a series of staged additions of base, which are calculated to maintain the pH within the desired range and the like. Products of higher purity may be obtained by exposing the imidazoline to conditions which favor ring opening prior to alkylation followed by reaction with the alkylating agent, e.g., sodium monochloroacetate, under carefully controlled conditions. By conducting the reaction of imidazoline or its ring opened derivative with the haloacetic acid salt under carefully controlled pH and temperature conditions during the reaction allows the reaction to proceed with lower molar ratios of substituted imidazoline or its derivatives to monohaloacetate salt resulting in a higher purity substantially fully alkylated product (less by-product unalkylated amide, glycolic acid, NaCl and residue haloacetate salt). Glycolic acid is formed from the haloacetate salt and is usually compensated for by excess monohaloacetate.

The imidazoline starting materials useful in the practice of the invention can be represented by the formula:

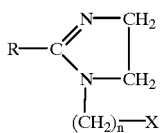

FORMULA II wherein R, n and X are as defined hereinbefore.

When R is derived from a natural source, R can be mixture of saturated and unsaturated aliphatic radicals derived from coconut oil or similar natural oil sources such as palm kernel oil or animal fat sources such as tallow. In that case, each R being a mixture of alkyl radicals containing from about 5 to 18 carbon atoms. R can also, preferably be derived from a saturated portion of coconut oil or similar natural vegetable oil. In the case of coconut oil fatty acid, each R ranges from about 6 to about 18 carbon atoms. These ranges are given as covering about 90% of the R groups in the compound. Since these R groups are derived from natural sources, they can contain small amounts of other carbon chains. In addition, imidazolines based on single carboxylic acids, e.g., lauric acid, or other cuts, as suited for the particular application, may be used.

The imidazolines used in the present invention should be in substantially pure form. "Substantially pure" is intended to mean substantially free from fatty acids, aminoethylethanol amine, amido esters and diamides. For the purposes of the invention, the presence of amido amines is acceptable. Any convenient method for preparing the imidazoline can be used.

Examples of the starting imidazolines include 2-heptylimidazoline, 2-dodecylimidazoline, 2-heptadecylimidazoline, 1-hydroxyethyl-2-dodecylimidazoline, 1-hydroxy-ethyl-2-heptadecylimidazoline, and the like. Examples of single fatty acids and fatty acids mixtures that can be used to prepare the imidazolines can include coconut oil fatty acid, palm kernel oil fatty acid, capric, caproic, caprylic, hexadecadienoic, lauric, linoleic, linolenic, margaric, myristic, myristoleic, oleic, palmitic, palmitoleic, stearic and the like.

The imidazoline is reacted under conditions which will favor opening of the imidazoline ring prior to the alkylation reaction. In one embodiment of the invention, the imidazoline can be heated under an elevated pH ranging from about 8.5 to about 10 to facilitate opening of at least a majority of the imidazoline rings. In an alternative embodiment, the imidazoline can be admixed with the monohaloacetate at elevated pH under conditions that favor ring opening. In a third embodiment, the monohaloacetate can be added to the imidazoline along with the addition of base under conditions y that maintain the pH within the range of about 9 to about 10 during the addition.

For alkylation the imidazoline or ring opened derivative is heated with a salt of a monohaloacetate preferably in aqueous solution prior to admixture with the imidazoline. The salt can be prepared from the acid just prior to the reaction with an excess of base to provide neutralization for the hydrohalic acid formed during the reaction of the imidazoline with the haloacetate salt. The excess pH preferably ranges from about 8 to about 10. The haloacetate salt can be purchased or prepared elsewhere, dissolved in water and used as such or preferably with an added amount of base corresponding to the excess discussed above.

Examples of suitable monohaloacetate salts wherein the cationic portion is an alkali metal ion include sodium monochloroacetate, sodium monobromoacetate, and potassium monochloroacetate and potassium monobromoacetate. The preferred monohaloacetates are the sodium and potassium salts of monochloroacetic acid.

Examples of suitable alkalis that can be used in the process of the invention include sodium hydroxide, potassium hydroxide, sodium carbonate, potassium carbonate, sodium bicarbonate, potassium bicarbonate and the like. Preferably, the alkali is sodium and/or potassium hydroxide.

The mole ratio of the monohaloacetic acid or its salt form to the imidazoline or amine is preferably greater than one. At amounts of less than one, insufficient monchaloacetic acid salt is present to effect complete alkylation leaving the product contaminated with the amido amine which has no surface activity. A surprising result of the present invention is that the ratio can be kept as low as possible with only a slight excess needed to drive the reaction substantially to completion. It is possible by means of the invention to keep the ratio as low as 1.05:1. Preferably the ratio ranges from about 1.05:1 to about 1.5:1, more preferably 1.05:1 to about 1.4:1 and most preferably 1.05:1 to about 1.2:1.

The reaction is generally conducted at a temperature conducive to the reaction as is well known in the industry. Reaction temperatures for the main reaction can range as high as 95° C., preferably and more preferably between about 75° C. and about 85° C. between about 50° C. and about 95° C. The reaction can be heated after the main reaction is considered complete to insure completeness of reaction. Temperatures during this portion of the reaction can range as high as 100° C. The reaction times are sufficient to accomplish each desired reaction step and can be easily determined by a skilled artisan.

In general, the monohaloacetic acid or salt is blended with the imidazoline at a rate as fast as possible and practical to admix the reactants completely. Because pH control is essential the reactants, especially the base, are added at such a rate as to prevent pH rises above about pH 10. Care is taken to avoid localized "hot spots" during the addition of base. The base is added incrementally to avoid any pH surge.

The careful pH and temperature control during the reaction allows the reaction to proceed with less sodium monohaloacetate salt resulting in a higher purity product (less by-product unalkylated amide, glycolic acid, NaCl and residue haloacetate salt). The compositions of the present invention are characterized by levels of unalkylated amide of less than about 3.5%, preferably less than about 2.0% and more preferably less than about 0.5% unalkylated amide; glycolic acid of less than about 4.5%, preferably less than about 3.5 and more preferably less than about 2.5% glycolic acid alkali metal salt, e.g., sodium chloride, of less than about 27%, preferably less than about 23% and more preferably less than about 20% salt all on an actives basis.

The details of the process can be more fully seen in U.S. Ser. No. 08/135,094, the disclosure of which is hereby incorporated by reference.

Because of the improved purity, the products of the invention exhibit superior surfactant properties, greater formulating flexibility, in addition to being economically more attractive as compared to products obtained by purification of materials prepared by process of the prior art.

The amphoacetate surfactants as described above, exhibit enhanced wetting speed, greater surface tension reduction, high foaming and foam stabilization properties particularly in the presence of hydrocarbons which are known foam breakers, low toxicity, and excellent compatibility with other anionic, ionic and nonionic surfactants. These products are stable over a wide pH range and are biodegradable.

In addition to oil wells, the present invention can be used in any system that relies on maintaining a foam while in contact with hydrocarbons for effectiveness. Examples of such foams include fire fighting foams which can, in fighting fires such as airliner or chemical plant fires, come into contact with hydrocarbons.

The compositions of the invention can be used under the same mixing, temperature, pressure, and additional additives as are presently used in the art in preparing secondary, and tertiary foaming systems as well as foam formulating for drilling or stimulation, such as those generally based on anionic surfactants. These can be easily determined by one of ordinary skill in the art. In addition to the surfactant which is the subject of the invention, there can also be included foam stabilizers, foam boosters, pour point depressants and other common ingredients. It has been particularly found that more effective results can be obtained using a hydrocolloid, and preferably xanthan gum, (from about 0.01% to about 1.0% by weight based on the weight of the surfactant containing system of water, salts and foaming or surfactant package) as an adjuvant to the surfactant disclosed herein. The surfactant disclosed herein is generally used in an amount effective to prepare a foam alone or to prepare and stabilize the foam when used with other foamable surfactants. Illustrative amounts of the surfactant disclosed herein range from about 0.01% to about 1.0% by active weight based on the weight of the surfactant containing system of water, salts and foaming or surfactant package.

The present invention will now be more fully illustrated in the examples which follow. The percentage purity of the products prepared in the examples and as given in the claims are on an actives basis by weight based on the amount of active material present in the product as determined by subtracting the amount of sodium chloride, glycolic acid and amido amine from the as is solids of the reaction.

The surfactant of the invention as used in the examples is a cocoamphoacetate of Formula I wherein R is coco, n is 2, m is sodium and the surfactant composition is 37% active. This 37% active surfactant will be identified in the examples as "COCOAMPHO ACETATE". As used herein, GEROPON® AS-200 is a sodium cocyl isethionate anionic surfactant, MIRATAINE® CB is a cocamidopropyl betaine, MIRATAINE® CBS is a cocamidopropyl hydroxy sultaine, MIRANOL® C2M-NP is a disodium cocoampho diacetate amphoteric surfactant; MIRANOL® C2M-SF is a disodium cocoampho dipropionate amphoteric surfactant, RHODACAL® A246/L is a sodium alphaolefin sulfonate anionic surfactant; RHODACAL® DS-10 is a sodium dodecylbenzene sulfonate anionic surfactant; RHODAPEX® CD128 is an ammonium alcohol ether sulfate anionic surfactant, and RHODOPOL® XGD is an aqueous dispersible xanthan gum.

EXAMPLE I

Various surfactant blends were tested to determine the ability of a surfactant(s) to maintain a foam when in direct contact with a hydrocarbon.

CRUDE ON BOTTOM PROCEDURE

A brine containing 11.73 grams/liter calcium chloride, 6.21 grams/liter magnesium chloride and 37.84 grams/liter sodium chloride was prepared (Brine A).

The pH of a 200 cubic centimeter sample of Brine A was adjusted to pH 5.0–5.5 by bubbling $CO_2$ through the sample. To this 200 cubic centimeter aliquot was added 1.0 cubic centimeter of a test material (0.5%).

Brine A, containing the test surfactant was mixed for thirty seconds at high speed in a blender (Waring). Foam heights were recorded initially and after thirty and sixty seconds. The sample was then remixed in the blender for an additional thirty seconds and 200 cubic centimeters of the foam was transferred to a graduate cylinder containing 5 cubic centimeters (2.5%) crude oil. The weight of the 200 cubic centimeters of foam was measured to calculate foam quality. The ratio of foam to liquid or the % foam was measured initially and after 5, 10, 30, 60, 120 minutes and 16 hours.

TABLE I

FOAM EVALUATION
BRINE FORMULATION "A" WITH 1% MOBIL CRUDE ON BOTTOM
.05% OF A (75% CD128:25% X)
WITH 0.2% RHODOPOL XGD

|  | RHODAPEX CD 128 | RHODACAL DS1O | MIRANOL C2M-SF | GERAPON AS200 | MIRATAINE CB | MIRATAINE CBS | COCOAMPHO ACETATE |
|---|---|---|---|---|---|---|---|
| FOAM HEIGHT (CM) WARING BLENDER | | | | | | | |
| INITIAL | 9.5 | 9 | 8.3 | 9 | 7 | 9 | 2.3 |
| AFTER 30' | 9.5 | 9 | 8.3 | 9 | 7 | 9 | 2.2 |
| AFTER 60' | 9.5 | 8.9 | 8.1 | 9 | 6.8 | 9 | 2.1 |
| FOAM PERSISTENCE W/ RESPECT TO TIME | | | | | | | |
| INITIAL | 98 | 98 | 98 | 96 | 98 | 98 | 95 |
| 5' | 98 | 98 | 98 | 98 | 98 | 98 | 60 |
| 10' | 95 | 98 | 98 | 98 | 98 | 98 | 55 |
| 30' | 93 | 92 | 93 | 95 | 92 | 95 | 50 |
| 80' | 72 | 66 | 51 | 85 | 72 | 85 | 45 |
| 120' | 43 | 47 | 34 | 20 | 23 | 20 | 45 |
| 16 H | 0 | 0 | 0 | 0 | 0 | 0 | 38 |
| FOAM QUALITY | 80 | 77 | 78 | 81 | 75 | 81 | 42 |

TABLE II

FOAM EVALUATION
BRINE FORMULATION "A" WITH 1% MOBIL CRUDE ON BOTTOM
WITH .05% SURFACTANT X
WITH 0.2% RHODOPOL XGD

|  | X = 50% RHODAPEX CD126 50% COCOAMPHO ACETATE | 75% RHODAPEX CD128 25% COCOAMPHO ACETATE | 50% RHODAPEX CD128 50% MIRANOL C2M-NP |
|---|---|---|---|
| WARING BLENDER FOAM HEIGHT (CM) | | | |
| INITIAL | 6 | 8.5 | 7 |
| AFTER 30" | 6 | 8.5 | 7 |
| AFTER 60" | 6 | 8.5 | 7 |
| FOAM PERSISTENCE WITH RESPECT TO TIME (% FOAM) | | | |
| INITIAL | 98 | 98 | 98 |
| AFTER 5' | 97 | 98 | 96 |
| AFTER 10' | 95 | 97 | 92 |
| AFTER 30' | 85 | 94 | 79 |
| AFTER 60' | 80 | 84 | 75 |
| AFTER 120' | 75 | 78 | 71 |
| AFTER 16 h | 66 | 40** | TRACE |
| FOAM OUALITY | | | |
| WEIGHT OF 200 cc OF FOAM (GM) | 58 | 44 | 52 |
| FOAM QUALITY | 71 | 78 | 74 |

**VERY LOW DENSITY FOAM

TABLE III

FOAM EVALUATION
BRINE FORMULATION "A" WITH 1% MOBIL CRUDE ON BOTTOM 0.5% OF SURFACTANT X

| X = | 50% RHODACAL A246/L 50% COCOAMPHO ACETATE | 50% RHODAPEX CD128 50% COCOAMPHO ACETATE |
|---|---|---|
| WARING BLENDER FOAM HEIGHT (CM) | | |
| INITIAL | 2.7 | 8 |
| AFTER 30" | 2.7 | 8 |
| AFTER 60" | 2.7 | 8 |
| FOAM PERSISTENCE WITH RESPECT TO TIME (% FOAM) | | |
| INITIAL | 95 | 95 |
| AFTER 5' | 85 | 80 |
| AFTER 10' | 68 | 76 |
| AFTER 30' | 63 | 72 |
| AFTER 60' | 57 | 71 |
| AFTER 120' | 53 | 67 |
| AFTER 16 h | 7 | TRACE |
| FOAM QUALITY | | |
| WEIGHT OF 200 cc OF FOAM (GM) | 84 | 50 |
| FOAM QUALITY | 58 | 75 |

TABLE IV

FOAM EVALUATION
BRINE FORMULATION "A" WITH 1% MOBIL CRUDE ON BOTTOM 0.5% OF SURFACTANT X

| X = | 33% RHODAPEX CD128 33% RHODACAL 246/L 33% MIRANOL C2M-NP | 33% RHODAPEX CD128 33% RHODACAL A246/L 33% COCOAMPHO ACETATE |
|---|---|---|
| WARING BLENDER FOAM HEIGHT (CM) | | |
| INITIAL | 6 | 4.6 |
| AFTER 30" | 6 | 4.6 |
| AFTER 60" | 6 | 4.6 |
| FOAM PERSISTENCE WITH RESPECT TO TIME (% FOAM) | | |
| INITIAL | 98 | 98 |
| AFTER 5' | 95 | 96 |
| AFTER 10' | 90 | 90 |
| AFTER 30' | 8S | 85 |
| APTER 60' | 74 | 75 |
| AFTER 120' | 68 | 72 |
| AFTER 16 h | 20** | 60 |
| FOAM QUALITY | | |
| FOAM QUALITY | | |
| WEIGHT OF 200 cc OF FOAM (GM) | 60 | 75 |
| FOAM QUALITY | 70 | 62.5 |

**VERY LOW DENSITY FOAM

TABLE V

FOAM EVALUATION
BRINE FORMULATION "A" WITH 1% MOBIL CRUDE ON BOTTOM
WITH 0.5% OF SURFACTANT X
WITH 0.2% RHODOPOL XGD

| X = | 15% ETHYLENE GLYCOL 29% RHODAPEX CD128 29% RHODACAL 246/L 29% COCOAMPHO ACETATE | 15% PROPYLENE GLYCOL 29% RHODAPEX CD12B 29% RHODACAL A246/L 29% COCOAMPHO ACETATE | 15% ETHYLENE GLYCOL 29% ◊ 29% RHODACAL A246/L 29% COCOAMPHO ACETATE |
|---|---|---|---|
| WARING BLENDER FOAM HEIGHT (CM) | | | |
| INITIAL | 5 | 5.5 | 7 |
| AFTER 30" | 5 | 5.5 | 7 |
| AFTER 60" | 5 | S.5 | 7 |
| FOAM PERSISTENCE WITH RESPECT TO TIME (% FOAM) | | | |
| INITIAL | 98 | 98 | 98 |
| AFTER 5' | 9S | 97 | 98 |
| AFTER 10' | 90 | 87 | 95 |
| AFTER 30' | 86 | 84 | 90 |
| AFTER 60' | 77 | 77 | 83 |
| AFTER 120' | 70 | 71 | 77 |
| AFTER 16 h | 42 | 32 | 67 |
| FOAM QUALITY | | | |
| WEIGHT OF 200 cc OF FOAM (GM) | 65 | 61 | 53 |
| FOAM QUALITY | 67.5 | 69.5 | 73.5 |

◊ Ammonium Ether Sulfate
**VERY LOW DENSITY FOAM

The results of these tests show that the cocoamphoacetate alone or in combination with a foaming agent provides good initial foam and stabilizes foam at times greater than 16 hours while in contact with hydrocarbon whereas other formulations not formulated in accordance with the invention showed little to no foam after 16 hours.

EXAMPLE II

Based on the criteria for a $CO_2$ mobility control agent, a hydrocarbon tolerant foam agent was developed which has the following formulation:

28.6% RHODAPEX® CD128
28.6% RHODOCAL® A246/L
28.6% COCOAMPHOACETATE (37%)
14.3% ETHYLENE GLYCOL

This formulation can be used as a $CO_2$ mobility control agents or as a foam agent for foam fracturing or air drilling. This composition is significantly more tolerant than conventional anionic foam agents presently in use in the oil industry.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A process for treating a surface with sustainable foam by means of a foamable surfactant wherein the foamable surfactant comprises a substantially pure substituted imidazoline-derived amphoacetate containing as a component thereof a compound of the formula:

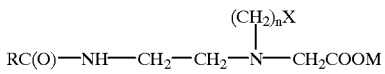

wherein R represents an aliphatic radical containing from about 5 to about 19 carbon atoms per molecule, X is OH or $NH_2$, n is an integer of from 2 to 4 inclusive and M is a metal, said composition containing less than about 3.5% unalkylated amide and less than about 4.5% glycolic acid, wherein the amphoacetate is produced by a process in which the imidazoline ring is opened prior to alkylation.

2. A process as recited in claim 1 wherein the composition contains less than about 2.0% unalkylated amide.

3. A process as recited in claim 1 wherein the composition contains less than about 3.5% glycolic acid.

4. A composition as recited in claim 1 wherein the composition additionally contains less than about 27% alkali metal halide salt.

5. A process as recited in claim 1 wherein X is OH.

6. A process as recited in claim 1 wherein R is derived from a member selected from the group consisting of coconut oil fatty acids, palm kernel oil fatty acids, capric, caproic, caprylic, hexadecadienoic, lauric, linoleic, linolenic, margaric, myristic, myristoleic, oleic, palmitic, palmitoleic, and stearic acids and mixtures thereof.

7. A process as recited in claim 1 wherein M is an alkali metal.

8. A process as recited in claim 1 wherein R is derived from coconut oil fatty acids, n is 2, X is OH and M is sodium.

* * * * *